Aug. 7, 1951  A. R. KANE  2,563,470
PORTABLE LOAD SUPPORTING STRUCTURE
Filed March 30, 1949  2 Sheets-Sheet 1

Arthur R. Kane
INVENTOR

BY Browning & Simms

ATTORNEYS

Aug. 7, 1951     A. R. KANE     2,563,470
PORTABLE LOAD SUPPORTING STRUCTURE
Filed March 30, 1949     2 Sheets-Sheet 2
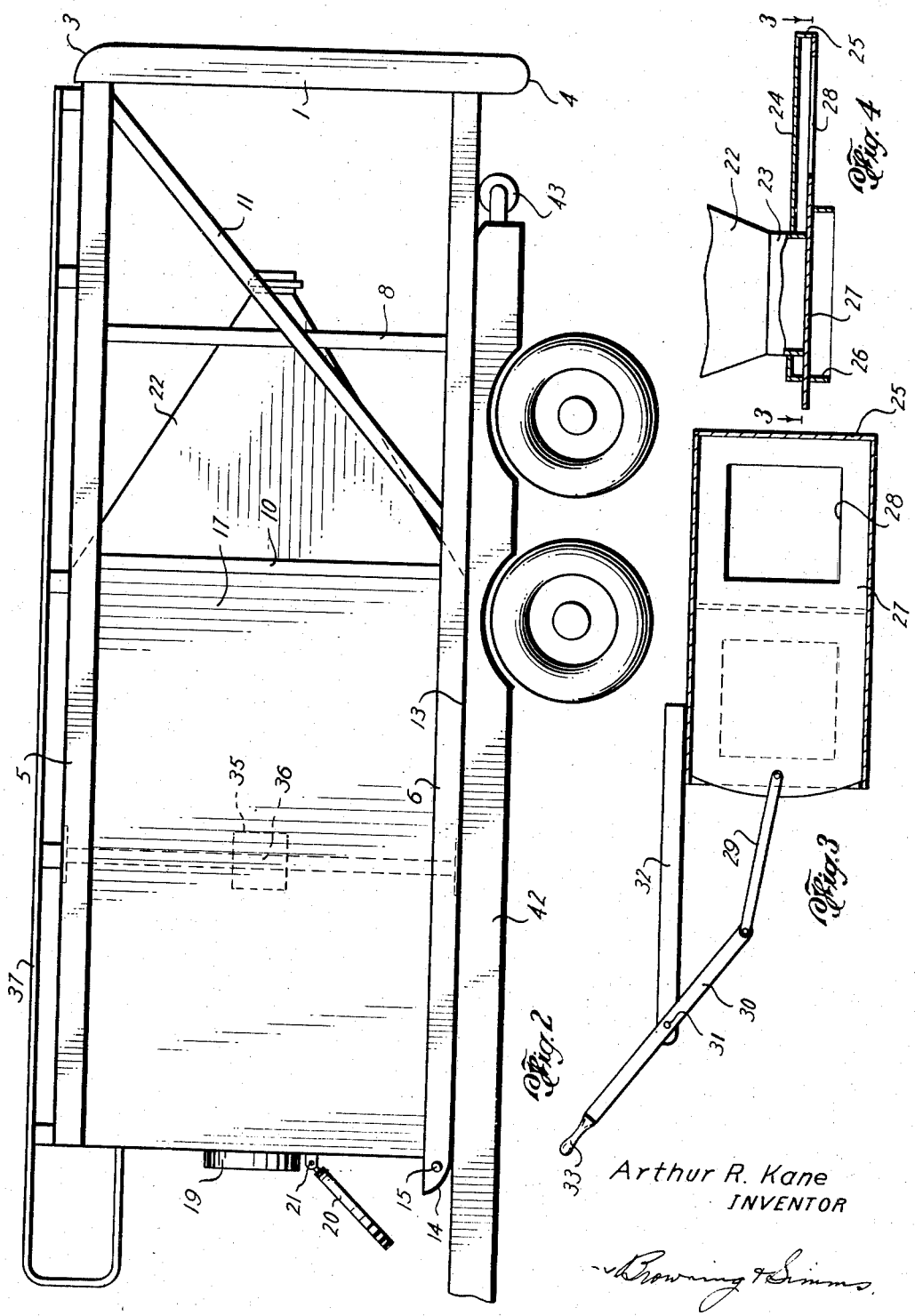
Arthur R. Kane
INVENTOR
ATTORNEYS Patented Aug. 7, 1951

2,563,470

UNITED STATES PATENT OFFICE 2,563,470

PORTABLE LOAD SUPPORTING STRUCTURE

Arthur R. Kane, Corpus Christi, Tex., assignor to Bulk Barites, Inc., Corpus Christi, Tex., a corporation of Texas Application March 30, 1949, Serial No. 84,425

7 Claims. (Cl. 280—5)

This invention has to do with portable load supports and particularly portable tank structures, and has for its general object the provision of such a structure which may be readily loaded or unloaded from a truck or dolly or otherwise transported with a minimum of difficulty and a minimum of danger of damage to the tank structure.

More particularly this invention is adapted to the construction of tank structures of a very substantial size and weight capable of holding several tons of material such as a finely powdered material of high specific gravity supporting the same from fifteen to twenty feet above ground, yet be light enough and arranged in such fashion so that it may readily be transported from place to place upon a large truck or dolly. In the past, it has been customary with structures of such proportions and capacity to dismantle them when desired to move them to a new location, and to reassemble them in their new location. This is because of the difficulty encountered in handling the heavy and bulky structure ordinarily required for such a support.

In accordance with this invention, the load support is in the form of a tank structure mounted upon a base having two or more skid members rounded at their opposite ends with the upright supporting columns of the tank extending upwardly from such skid members. The supporting columns or corner posts are secured rigidly to the base and are secured to each other above the base by various cross members and diagonal bracing so as to form a rigid frame for the support of the tank. The tank itself is made of material so light that if left by itself it would not support its load without the bulging of its sides. However, suitable bracing is employed between these sides intermediate the columns or corner posts, and the corner posts themselves, braced as they are below the tank with respect to each other, serve not only to support the tank against the pull of gravity but to hold its corners against possible breakage, while the intermediate bracing above referred to prevents the sides of the tank from bulging objectionably.

In order that the tank may be more readily transported, two of the columns or corner posts are made in the form of skids or runners having outwardly presented skid surfaces curved back over the tank and over the frame at their upper ends, so that the tank may be pulled over onto its side and skidded along on these columns. For the purpose of assisting in pulling the tank over on its side, suitable tie bar is joined to and extended between the two columns which form runners adjacent their upper ends, and any suitable pulling device may be secured to this bar for the purpose of pulling upon the structure and tilting it over on to its side in which position it will rest upon the runners just referred to. For the purpose of assisting in tilting the structure from its horizontal to its upright position, the two skids embodied in the base have their ends adjacent the runner columns extending somewhat beyond the runner columns so that when the normally upper end of the structure is raised, these skid ends will dig into the earth formation and prevent the lower end of the structure from skidding along the earth. However, the projecting ends of these skid members are rounded to a semi-circular form so that when on a solid surface, they may be skidded along as in sliding the tank structure from one place to another.

It is accordingly an object of this invention to provide a structure of the type referred to which may be easily transported, yet which will be rigid and adequate for its purpose and inexpensive to construct.

Other objects and advantages of this invention will become apparent from the following description taken in connection with the accompanying drawings wherein is set forth by way of illustration and example one embodiment of the invention.

In the drawings:

Fig. 2 is a side view of a tank structure such as that illustrated in Fig. 1, but showing the same in place for transportation upon the bed of a truck or dolly.

Fig. 3 is a view partly in cross-section and partly in bottom plan, illustrating in fragmentary enlarged fashion the valve or release mechanism for drawing off the contents of the portable tank when the same is in use.

Fig. 4 is a view partly in side elevation and partly in vertical cross-section illustrating the structure shown in Fig. 3.

Figure 1:
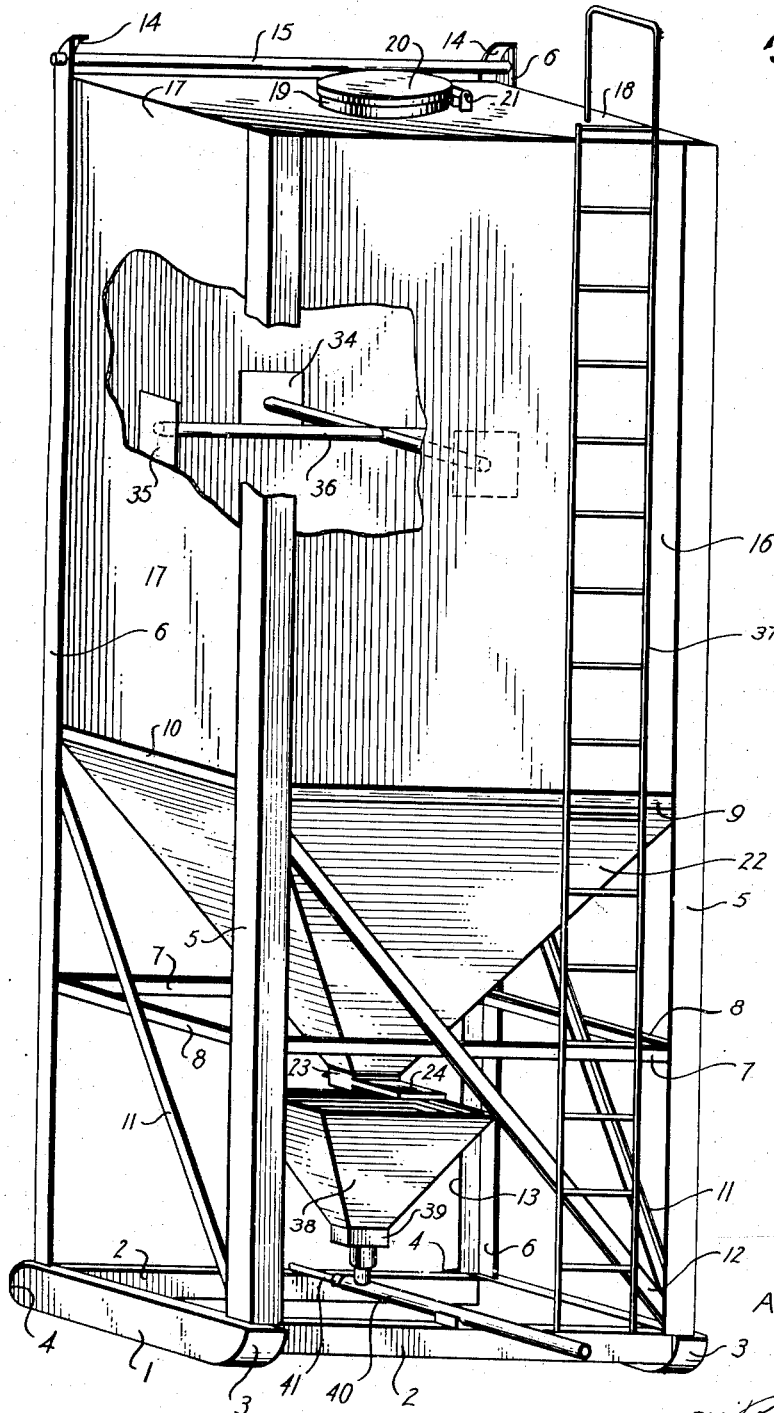
Fig. 1 is a perspective view, with parts broken away and shown in section for purposes of illustration, showing a portable tank structure made in accordance with this invention.

Referring now more in detail to the drawings, the portable tank structure illustrated, when in normal use, rests upon a base consisting of substantially parallel beams or skid members 1 which are spaced apart and inter-connected by means of cross beams 2. The skid members 1 are each rounded at one end as indicated at 3 so as to provide a runner or skid effect to make them more easily slid over earth formation or other surface upon which the structure may be resting. At their opposite ends, these beams are provided with projecting rounded ends 4 of semi-circular or semi-cylindrical formation so that they may readily be slid toward the rounded ends 4 when resting upon the ground or a similar surface.

Extending upwardly from the ends 3 of the skids 1 are upright columns or corner posts 5, and similar posts 6 extend upwardly from the beams 1 adjacent but spaced inwardly from the ends 4 respectively. The beams 5 and 6, as illustrated, are of L-shaped or angle iron cross-section and are joined together a short distance above the beams 2 by means of laterally extending normally horizontal braces 7, and on substantially the same level as the braces 7, the columns 5 are each joined respectively to the corresponding column 6 by means of braces 8 which may be similar in all respects to the braces 7.

Likewise, a short distance above the braces 7, the columns 5 are joined together by braces 9 substantially parallel to the braces 7, and each of the columns 5 is joined to the adjacent columns 6 on substantially the same level with the braces 9 by means of braces 10.

Diagonal bracing against the stresses exerted upon the framework in moving it from vertical to horizontal position and vice versa, are dealt with by means of diagonal braces 11 extending from substantially the lower ends of the columns 5 respectively to substantially the level of the horizontal braces 10 where they are joined to the columns 6 respectively. Inasmuch as the major diagonal forces upon this frame will be exerted only in the direction in which the frame is tilted in moving it to or from its vertical position, diagonal bracing in a direction at right angles to the braces 11 is not required to be as great as that afforded by the braces 11, and a single diagonal brace 12 extending from the lower end of one of the columns 5 to the other column 5 at a level substantially that of the brace 9, is found sufficient.

Each of the columns 6 has one of the legs of its L-shaped cross-section provided with a substantially plane surface such as indicated at 13, this surface serving to provide a skid and support for the structure when the same is in horizontal position. It will be seen that the surfaces 13 on both of the columns 6 will be in substantially the same plane extending longitudinally of these columns, and that these surfaces 13 are bent back over the upper end of the frame at the upper ends of these columns as illustrated at 14 for the purpose of providing curved leading ends to facilitate sliding of the structure when in its horizontal position.

Extending between the columns 6 at their upper ends but spaced inwardly from the surfaces 13 and 14, is a tie bar 15 to which a suitable pulling device may be secured for the purpose of tilting the tank structure from its vertical position, as shown in Fig. 1, into a horizontal position, as shown in Fig. 2.

Positioned between the columns 5 and 6 and substantially filling the space between them from the braces 9 upwardly to substantially the upper ends of these columns, is a tank having side walls 16 and 17 secured in any desired manner to the columns 5 and 6 respectively. The upper end of this tank structure may, if desired, be closed by a suitable closure wall such as illustrated at 18, and access to the interior of the tank through this closure wall may be had through a suitable opening which, in this instance, is shown as being surrounded by an upstanding neck portion 19 of a shape and size to receive a cover 20. The cover 20 may, if desired, be hinged to the tank by means of a pivot 21.

At its lower end, the tank structure just described is closed by converging walls 22 inclined downwardly and inwardly until they substantially meet at their lower edges. These walls are terminated a short distance from the point at which they would actually meet, and form by their lower edges a substantially square opening from which extends a conduit 23. This conduit 23 is of short length and is adapted to be closed or opened by means of a valve structure more clearly illustrated in Figs. 3 and 4 of the drawings. By reference to these figures, it will be seen that there is a plate member 24 surrounding the conduit 23 just above its lower end, and that this plate member 24 has downwardly depending edge flanges 25 and 26 respectively. The flange 26 is spaced slightly below the flange 25 and has parts extending across beneath the plate 24 and spaced therefrom in such fashion as to provide a guide for the slide member 27. This slide member 27 acts as a valve so that when in the position illustrated in Figs. 3 and 4, it will close the lower end of the conduit 23, but when moved to the left as seen in these figures, it will be operative to bring the opening 28 to the plate 27 beneath the lower end of the conduit 23 and thereby open this lower end of the conduit to permit materials to be discharged from the tank above.

For the purpose of moving the slide or plate 27, there is provided a suitable mechanism such as the link 29 pivoted at one end to the plate 27 and at its other end, to the free end of a lever 30. The lever 30 is provided with a fulcrum at 31 upon a bracket 32 secured to the depending flange 25, so that when the handle 33 of the lever 30 is swung around clockwise, as seen in Fig. 3, the slide 27 will be moved to the left to open the lower end of the conduit 23.

For the sake of achieving lightness of construction, and hence, better portability of the structure as well as cheapness thereof, the walls 16 and 17 of the tank, while braced at their corners by means of the columns 5 and 6 respectively, are made of the thinnest possible gauge of material. In order to make it possible to use a very thin gauge of material in these walls, so thin in fact that the walls would not support the weight of the substances to be contained therein without objectionable bulging, suitable interior bracing for the tank is provided. In the form illustrated, this bracing is anchored to the thin tank walls by means of reinforcing plates 34 and 35 welded all around their edges to the tank walls. This manner of securing the reinforcing plates 34 and 35 to the tank walls 16 and 17 respectively, provides a means for distributing the forces to be transmitted to the reinforcing structure over a considerable area of the walls 16 and 17 respectively, and thereby avoid damage to such walls. After the plates 34 and 35 have been welded or similarly secured in position, they are joined within the tank by means of crossed bars or rods 36, shown in this instance as being welded together at their mid-points. It will be seen that by virtue of this structure, the tank walls may be made of very much thinner material than would otherwise be necessary, and yet objectionable bulging of the walls when the tank is loaded will be avoided.

In those cases in which the size of the portable tank structure warrants such a device, a ladder 37 may be secured up the side of the tank structure for the purpose of permitting access to the top thereof.

In the example illustrated in the drawings, the tank structure is intended for the purpose of holding supplies of materials adapted to be mixed with the drilling mud used in drilling oil and gas wells. In order to provide for the mixing of such materials with the drilling mud directly as the materials are drawn from the tank, the lower portion of the tank structure is adapted to receive a suitable hopper 38 with a valve structure 39 at its lower end, the hopper being positioned directly below the opening from the conduit 23 to receive materials therefrom, and the valve 39 being adapted for the purpose of metering the materials from the hopper 38 into the pipe 40 which leads to the mud pits. As the material drops through the valve 39 into the pipe 40, it is promptly and thoroughly mixed with the mud fluid by means of a jet of mud introduced into the end of pipe 40 through a small pipe 41 and jetted across the opening from the valve 39. This high pressure jet of mud striking the material as it falls from the valve 39 serves to thoroughly mix it and incorporate it into the mud fluid.

With reference to Fig. 2, the position of the apparatus just described is illustrated as this apparatus rests upon the columns 6 lying upon the bed 42 of a truck or dolly. Such trucks or dollies are customarily provided at their rearmost ends with rollers 43 extending horizontally across the rear end of the bed so as to facilitate the loading of heavy objects. The present structure is peculiarly designed for cooperation with this type of hauling equipment.

As above stated, Fig. 1 illustrates the portable tank in its usual operative position in which it stands upon the base which embodies the skid members 1. When in this position, it may be moved from place to place by sliding it along as it rests on the skid members 1, it being possible for these skid members to be moved in either direction because of their rounded shapes at their ends 3 and 4.

When it is desired to transport the tank structure for a considerable distance, a suitable pulling mechanism, such as a cable attached to a winch, is secured to the bar 15 and a truck or dolly of the type shown in Fig. 2 is backed up to a point adjacent the tank. As illustrated, it will be so arranged that the roller 43 will at this stage of the procedure extend transvesely of the columns 6, and substantially parallel to the skid surfaces on these columns. With force applied through the pulling device to the bar 15, the structure may then be tilted until the surfaces 13 engage the roller 43 whereupon continued pulling will cause the device to be tilted over onto the truck 42. Further pulling on the pulling device will cause the entire structure to be moved forwardly on the truck bed 42 until it occupies a suitable position for transportation such as illustrated in Fig. 2.

When the new location has been reached and it is desired to unload the tank structure and again cause it to assume its vertical position, as illustrated in Fig. 1, the truck is moved with the structure on the truck bed until the base of the structure is substantially over the location where it is desired for the structure to stand. Then this base is tied by a cable or the like to a suitable anchor at a distance behind the truck, and the truck is moved forward sliding as it moves out from under the tank structure. As soon as the truck is moved forward a sufficient distance for the rear end of the tank structure to be overbalanced and dropped to the ground, it will be seen that the projecting ends 4 of the beams or skids 1 will engage the ground. These will tend to dig into the soft ground formation because of the fact that at this point a great deal of the weight of the tank structure will be resting upon these two projecting members. Then by backward movement of the truck, with the projecting members engaging and sticking into the ground surface so as to prevent the bottom of the tank structure from sliding, the tank structure may be moved back to its original vertical position and again placed in operation.

If it should at any time become desirable to slide the tank structure in horizontal position along a flat surface other than a truck bed with the parts 4 overhanging the rear end of the truck bed, this may be accomplished because of the semicircular nature of the rounded ends 4 of the beams 1.

It will be apparent that during the loading and unloading operations just described, the diagonal bracing members 11 will take substantially all the diagonal loads on the frame of the structure and that these loads will in nearly all cases be in such direction that these members will be in tension so that they may be made of smaller cross-section than would be necessary if they were to be loaded in compression. This naturally makes for a lighter over-all construction without sacrificing strength or rigidity, and hence, it makes a cheaper and more readily portable structure. Furthermore, it will be noted that all of the bracing between the columns 5 and 6 is positioned below the tank 16, thereby helping to balance the weight of the tank structure and avoid a concentration of weight in the upper portion of the structure. The tank walls themselves serve to some extent to brace and space apart the columns 5 and 6 adjacent their upper ends but the bracing of these columns adjacent their lower ends enables them in turn to lend rigidity and strength to the walls of the tank as well as to support the tank properly when it is loaded.

From the foregoing, it will readily be seen that a structure has been provided which carries out and fully accomplishes all of the objects and advantages sought by this invention. It is to be understood that the structure as illustrated is by way of example only and is not to be taken as a limitation upon the scope of the invention. It will be seen that the invention may assume various forms and be made up of various elements differing from those illustrated in the accompanying drawings so long as the same are incorporated within the terms of the appended claims.

The invention having been described, what is claimed is:

1. A portable tank structure comprising a frame having a normally horizontal base, a plurality of normally upright columns disposed at spaced intervals about and extending from said base and defining the corners of a polygonal space between them, lateral and diagonal bracing between portions of said columns adjacent said base and remote from the ends of said columns opposite said base, said base having two opposite and substantially parallel members rounded at their opposite ends to provide skids or runners upon which the structure might be moved when said columns are in upright position, the said members each having a free end projecting a substantial distance in its longitudinal direction laterally beyond the adjacent columns, and the columns adjacent corresponding ends of said skid members having skid surfaces presented laterally outwardly with respect to said frame in the same direction as said projecting ends and curved back over the frame at their upper ends to provide skids upon which the structure may be moved when in reclining position, and a tank structure disposed between and joined to the upper free portions of said columns.

2. A portable tank structure comprising a frame having a normally horizontal base, a plurality of normally upright columns disposed at spaced intervals about and extending from said base and defining the corners of a polygonal space between them, lateral and diagonal bracing between portions of said columns adjacent said base and remote from the ends of said columns opposite said base, said base having two opposite and substantially parallel members rounded at their opposite ends to provide skids or runners upon which the structure might be moved when said columns are in upright position, the said members each having a free end projecting a substantial distance in its longitudinal direction laterally beyond the adjacent columns, and the columns adjacent corresponding ends of said skid members having skid surfaces presented laterally outwardly with respect to said frame in the same direction as said projecting ends and curved back over the frame at their upper ends to provide skids upon which the structure may be moved when in reclining position, a tank structure disposed between and joined to the upper free portions of said columns, and reinforcing plates secured to opposed portions of the inner walls of the tank structure intermediate and spaced from said columns and bracing means within said tank joining said reinforcing plates.

3. A portable tank structure comprising a frame having a normally horizontal base, a plurality of normally upright columns disposed at spaced intervals about and extending from said base and defining the corners of a polygonal space between them, lateral and diagonal bracing between portions of said columns adjacent said base and remote from the ends of said columns opposite said base, said base having two opposite and substantially parallel members rounded at their opposite ends to provide skids or runners upon which the structure might be moved when said columns are in upright position, the said members each having a free end projecting a substantial distance in its longitudinal direction laterally beyond the adjacent columns, the columns adjacent corresponding ends of said skid members having skid surfaces presented laterally outwardly with respect to said frame in the same direction as said projecting ends and curved back over the frame at their upper ends to provide skids upon which the structure may be moved when in reclining position, a rigid bar joining the upper ends of said columns having said skid surfaces thereon, said rigid bar being disposed inwardly of the plane of said skid surfaces whereby it would be supported free of a supporting surface upon which said skid surfaces might rest, and a tank structure disposed between and joined to the upper free portions of said columns.

4. A portable load supporting structure comprising a frame having a normally horizontal base, a plurality of normally upright columns disposed at spaced intervals about and extending from said base and defining the corners of a polygonal space between them, a load receiving structure connecting and carried on said columns remote from the base, lateral and diagonal bracing between portions of said columns adjacent said base and remote from the ends of said columns opposite said base, said base having two opposite and substantially parallel members rounded at their opposite ends to provide skids or runners upon which the structure might be moved when said columns are in upright position, the said members each having a free end projecting a substantial distance in its longitudinal direction laterally beyond the adjacent columns, and the columns adjacent corresponding ends of said skid members having skid surfaces presented laterally outwardly with respect to said frame in the same direction as said projecting ends and curved back over the frame at their upper ends to provide skids upon which the structure may be moved when in reclining position.

5. A portable load supporting structure comprising a frame having a normally horizontal base, a plurality of normally upright columns disposed at spaced intervals about and extending from said base and defining the corners of a polygonal space between them, a load receiving structure connecting and carried on said columns remote from the base, lateral and diagonal bracing between portions of said columns adjacent said base and remote from the ends of said columns opposite said base, said base having two opposite and substantially parallel members rounded at their opposite ends to provide skids or runners upon which the structure might be moved when said columns are in upright position, the said members each having a free end projecting a substantial distance in its longitudinal direction laterally beyond said columns, the columns adjacent corresponding ends of said skid members having skid surfaces presented laterally outwardly with respect to said frame in the same direction as said projecting ends and curved back over the frame at their upper ends to provide skids upon which the structure may be moved when in reclining position, a rigid bar joining the upper ends of said columns having skid surfaces thereon, said rigid bar being disposed inwardly of the plane of said skid surfaces whereby it would be supported free of a supporting surface upon which said skid surfaces might rest.

6. A portable load supporting structure comprising a frame having a normally horizontal base, a plurality of normally upright columns disposed at spaced intervals about and extending from said base and defining the corners of a polygonal space between them, a load receiving structure connecting and carried on said columns remote from the base, lateral and diagonal bracing between portion of said columns adjacent said base and remote from the ends of said columns opposite said base, said base having opposite and substantially parallel members rounded at their opposite ends to provide skids or runners upon which the structure might be moved when said columns are in upright position, and the columns adjacent corresponding ends of said skids being also provided with skid surfaces presented laterally outwardly with respect to said frame and curved back over the frame at their upper ends to provide skids upon which the structure may be moved when in reclining position.

7. A portable load supporting structure comprising a frame having a normally horizontal base, a plurality of normally upright columns disposed at spaced intervals about and extending from said base and defining the corners of a polygonal space between them, a load receiving structure connecting and carried on said columns remote from the base, lateral and diagonal bracing between portions of said columns adjacent said base, and remote from the ends of said columns opposite said base, said diagonal bracing comprising tension members extending from points high on one side of said frame and inclined downwardly and toward the opposite side of said frame, said base having opposite and substantially parallel members extending from that side of the frame to which said tension members are connected at high points and toward the opposite side of said frame and being rounded at their opposite ends to provide skids or runners upon which the structure might be moved when said columns are in upright position, and adjacent columns on that side of the frame to which said members are connected at high points, having skid surfaces presented laterally outwardly with respect to said frame and curved back over the frame at their upper ends to provide skids upon which the structure may be moved when in reclining position.

ARTHUR R. KANE.

REFERENCES CITED

The following references are of record in the file of this patent:

UNITED STATES PATENTS

| Number | Name | Date |
|---|---|---|
| 1,203,007 | Kegler | Oct. 31, 1916 |
| 1,686,931 | Russell | Oct. 9, 1928 |
| 1,768,186 | Vnuk | June 24, 1930 |
| 1,846,294 | Wiggins | Feb. 23, 1932 |
| 2,299,702 | Mosel | Oct. 20, 1942 |
| 2,346,436 | Krause | Apr. 11, 1944 |
| 2,417,979 | Gilmore | Mar. 25, 1947 |